(12) United States Patent
Endres et al.

(10) Patent No.: US 7,757,489 B2
(45) Date of Patent: Jul. 20, 2010

(54) ENGINE CONFIGURATION INCLUDING AN INTERNAL COMBUSTION ENGINE

(75) Inventors: Helmut Endres, Gifhorn (DE); Ekkehard Pott, Gifhorn (DE); Fred Thiele, Rühen (DE); Jörg Theobald, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/653,019

(22) Filed: Jan. 12, 2007

(65) Prior Publication Data
US 2007/0193269 A1    Aug. 23, 2007

Related U.S. Application Data

(63) Continuation of application No. PCT/EP2005/006765, filed on Jun. 23, 2005.

(30) Foreign Application Priority Data
Jul. 15, 2004    (DE)    ......... 10 2004 034 314

(51) Int. Cl.
*F02D 23/00* (2006.01)
*F02B 33/44* (2006.01)
*F02D 13/06* (2006.01)
*F02D 17/02* (2006.01)
*F02B 37/00* (2006.01)
*F02B 37/02* (2006.01)

(52) U.S. Cl. .......... 60/602; 60/612; 123/198 F
(58) Field of Classification Search ......... 60/600–603, 60/612; 123/198 F; *F02B 37/00, 37/02, F02B 37/18, 37/16, 37/007, 37/12, 33/44; F01N 7/10, F01N 7/04*
See application file for complete search history.

(56) References Cited

U.S. PATENT DOCUMENTS

| | | | |
|---|---|---|---|
| 4,406,126 A | 9/1983 | Yokokura et al. | ......... 60/602 |
| 4,452,208 A * | 6/1984 | Merlini et al. | ......... 123/198 F |
| 6,158,218 A | 12/2000 | Herold et al. | ......... 123/559.1 |
| 6,185,938 B1 | 2/2001 | Zander et al. | ......... 60/602 |
| 6,276,138 B1 * | 8/2001 | Welch | ......... 123/198 F |
| 6,874,463 B1 * | 4/2005 | Bolander et al. | ......... 123/198 F |
| 7,343,902 B2 * | 3/2008 | Brevick et al. | ......... 123/198 F |
| 2003/0188535 A1 | 10/2003 | Mader et al. | ......... 60/612 |

(Continued)

FOREIGN PATENT DOCUMENTS

CH    673684 A5 *    3/1990

(Continued)

OTHER PUBLICATIONS

A Translation DE 650 569.*

(Continued)

*Primary Examiner*—Thai Ba Trieu
(74) *Attorney, Agent, or Firm*—Manfred Beck, P.A.

(57) ABSTRACT

An engine configuration includes an internal combustion engine with a plurality of cylinders, at least one turbocharger and a first and a second exhaust gas tract. A turbine of the at least one turbocharger is associated with the first exhaust gas tract. Increased torque and increased power can be achieved when a bypass exhaust gas line emerging from at least one cylinder, which is associated with the first exhaust gas tract, is connected to the first exhaust gas tract such that it bypasses the at least one turbocharger.

18 Claims, 2 Drawing Sheets

U.S. PATENT DOCUMENTS

2008/0307788 A1 * 12/2008 Hokuto ................. 60/624
2009/0038293 A1 * 2/2009 Miyashita ............... 60/598

FOREIGN PATENT DOCUMENTS

| | | | |
|---|---|---|---|
| DE | 650 569 C | | 9/1937 |
| DE | 15 76 225 A1 | | 4/1970 |
| DE | 20 34 312 | | 1/1972 |
| DE | 36 29 841 A1 | | 5/1987 |
| DE | 36 39 090 C1 | | 2/1988 |
| DE | 3824346 A | * | 12/1989 |
| DE | 33 12 093 C2 | | 6/1992 |
| DE | 198 31 251 C2 | | 4/2000 |
| EP | 615059 A1 | * | 9/1994 |
| EP | 0 716 221 B1 | | 1/1999 |
| JP | 59 2 31 134 A | | 12/1984 |
| JP | 63 0 55 326 A | | 3/1988 |
| JP | 05071356 A | * | 3/1993 |
| JP | 05 1 41 256 A | | 6/1993 |
| JP | 2002213236 A | * | 7/2002 |
| JP | 2004 1 50 348 A | | 5/2004 |
| JP | 2007162481 A | * | 6/2007 |
| JP | 2007162489 A | * | 6/2007 |
| JP | 2007162577 A | * | 6/2007 |
| JP | 2007231812 A | * | 9/2007 |
| JP | 2007239493 A | * | 9/2007 |
| JP | 2007239688 A | * | 9/2007 |
| JP | 2007263033 A | * | 10/2007 |
| WO | WO 91/07 577 A1 | | 5/1991 |

OTHER PUBLICATIONS

A Certified English Translation of JP 63-055326 A.*

* cited by examiner

ENGINE CONFIGURATION INCLUDING AN INTERNAL COMBUSTION ENGINE

CROSS-REFERENCE TO RELATED APPLICATIONS

This application is a continuation, under 35 U.S.C. §120, of copending International Application No. PCT/EP2005/006765, filed Jun. 23, 2005, which designated the United States; this application also claims the priority, under 35 U.S.C. §119, of German Patent Application No. DE 10 2004 034 314.4, filed Jul. 15, 2004; the prior applications are herewith incorporated by reference in their entirety.

BACKGROUND OF THE INVENTION

Field of the Invention

The invention relates to an engine configuration including an internal combustion engine with a plurality of cylinders and at least one turbocharger.

European Patent Publication No. EP 0 716 221 B1 discloses a configuration of an internal combustion engine having two cylinder banks with two exhaust gas tracts which are connected via an exhaust gas collecting pipe. The connection can be established and interrupted depending on load conditions. A turbocharger is provided in one of the exhaust gas tracts.

SUMMARY OF THE INVENTION

It is an object of the invention to provide an engine configuration including an internal combustion engine with increased torque and power.

With the foregoing and other objects in view there is provided, in accordance with the invention, an engine configuration, including:
 a first exhaust gas tract;
 a second exhaust gas tract;
 an internal combustion engine having a plurality of cylinders, at least one of the cylinders being assigned to the first exhaust gas tract;
 the internal combustion engine having a turbocharger with a turbine assigned to the first exhaust gas tract; and
 a bypass exhaust gas line connected to the first exhaust gas tract, the bypass exhaust gas line starting at least one of the cylinders assigned to the first exhaust gas tract and bypassing the turbocharger.

In other words, according to the invention, there is provided a configuration with an internal combustion engine with a several cylinders and at least one turbocharger as well as a first and a second exhaust gas tract, wherein a turbine of the at least one turbocharger is assigned to the first exhaust gas tract, wherein a bypass exhaust gas line emerging from at least one cylinder, which is associated with the first exhaust gas tract, is connected to the first exhaust gas tract such that it bypasses the at least one turbocharger. The exhaust gas turbine of the turbocharger is charged by fewer than all cylinders of the internal combustion engine, preferably by half of the cylinders. The internal combustion engine is preferably a spark ignition engine. The power of the internal combustion engine can be increased by charging the internal combustion engine. In order to reduce fuel consumption, the system can advantageously be combined with a cylinder deactivation. The response time of the turbocharger or turbochargers can be reduced by a specific configuration of the turbocharger or turbochargers.

According to another feature of the invention there is provided a first cylinder bank and a second cylinder bank; and the cylinders of the internal combustion engine are disposed in a respective one of the first cylinder bank and the second cylinder bank. By providing the cylinders assigned to the first exhaust gas tract in the first cylinder bank and the cylinders assigned to the second exhaust gas tract in the second cylinder bank, the control of the possibly deactivatable cylinders is made easier in case of high or low power demand on the internal combustion engine. It is advantageous if the compressor of the at least one turbocharger provides all cylinders of both cylinder banks with the corresponding air-mass flow for the respective requested torque. A single throttle device, via which the total air-mass flow needed by the internal combustion engine is taken in, is then advantageously sufficient. Cylinders which do not supply exhaust gas to the turbine can be deactivated, i.e. shut off, through the use of a cylinder deactivation or their throughput can at least be reduced in case of low loads and/or low engine speeds. The compression conditions are preferably individually adjusted for the cylinders, for example such that the deactivatable cylinders have a higher compression and the other cylinders have a lower compression.

In accordance with an advantageous embodiment, a second turbocharger is provided in the bypass exhaust gas line. In accordance with an advantageous development, the second turbocharger is dimensioned to be different from the first turbocharger. This allows an advantageous tuning for different power and engine speed ranges of the internal combustion engine.

In accordance with an advantageous embodiment, a separate turbocharger is assigned to each cylinder bank wherein a bypass exhaust gas line, which starts at at least one cylinder assigned to the second exhaust gas tract, is connected to the second exhaust gas tract such that it bypasses the second turbocharger. The air intake side can be shared by both cylinder banks. Alternatively, an air intake side of the internal combustion engine as well an exhaust gas system can advantageously be separated at least as a dual flow configuration along their entire running length, such that the two cylinder banks have their respective separate air supply. When there is a correspondingly low load request, a part of the cylinders can be shut off i.e. deactivated such that either at least a part of the cylinders or up to all cylinders of a cylinder bank are shut off or, alternatively, respectively some of the cylinders of the two cylinder banks, preferably an equal number of cylinders of the two cylinder banks, are shut off. Accordingly the two turbochargers are charged with exhaust gas by fewer than all cylinders of a cylinder bank. The exhaust gas of the remaining cylinders can be fed into the respective exhaust gas tract while the respective turbine of the respective turbocharger is bypassed. The internal combustion engine is preferably a spark ignition engine with direct fuel injection.

According to another feature of the invention, the cylinders are assigned to a respective one of the first exhaust gas tract and the second exhaust gas tract, the cylinders assigned to the first exhaust gas tract are disposed in the first cylinder bank and the cylinders assigned to the second exhaust gas tract are disposed in the second cylinder bank.

According to another feature of the invention, the internal combustion engine has a further turbocharger, the further turbocharger is provided in the bypass exhaust gas line connected to the first exhaust gas tract. According to another feature of the invention, the further turbocharger is dimensioned to be different from the turbocharger.

According to another feature of the invention, the internal combustion engine has a further turbocharger, the turbocharger is assigned to the first cylinder bank, and the further turbocharger is assigned to the second cylinder bank.

According to another feature of the invention there is provided a further bypass exhaust gas line connected to the second exhaust gas tract, the further bypass exhaust gas line starts at least one of the cylinders assigned to the second exhaust gas tract and bypasses the further turbocharger.

According to another feature of the invention, the first cylinder bank and the second cylinder bank each have a respective separate air supply.

According to an alternative feature of the invention, the first cylinder bank and the second cylinder bank have a common air supply.

According to another feature of the invention, the first exhaust gas tract and the second exhaust gas tract have respective running lengths and are separated from one another along the running lengths such that the first exhaust gas tract and the second exhaust gas tract form at least a dual-flow configuration along the running lengths.

According to another feature of the invention, given ones of the cylinders, whose exhaust gas can be fed into the first exhaust gas tract by passing the turbine of the turbocharger, are configured such that their throughput can be reduced or completely deactivated.

According to another feature of the invention, the further turbocharger, which is provided in the bypass exhaust gas line, has a turbine; and given ones of the cylinders, whose exhaust gas can be fed into the first exhaust gas tract by passing the turbine of the turbocharger or the turbine of the further turbocharger, are configured such that a throughput of the given ones of the cylinders can be reduced or completely deactivated.

According to another feature of the invention, the further turbocharger, which is assigned to the second cylinder bank, has a turbine; and given ones of the cylinders, whose exhaust gas can be fed into the first exhaust gas tract or the second exhaust gas tract by passing the turbine of the turbocharger or the turbine of the further turbocharger, are configured such that a throughput of the given ones of the cylinders can be reduced or completely deactivated.

According to another feature of the invention, the given ones of the cylinders, which are configured to be deactivatable with respect to their throughput, have a compression greater than a compression of non-deactivatable ones of the cylinders of the internal combustion engine.

According to another feature of the invention, the internal combustion engine is a direct-injection spark-ignition engine.

Other features which are considered as characteristic for the invention are set forth in the appended claims.

Although the invention is illustrated and described herein as embodied in a engine configuration including an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
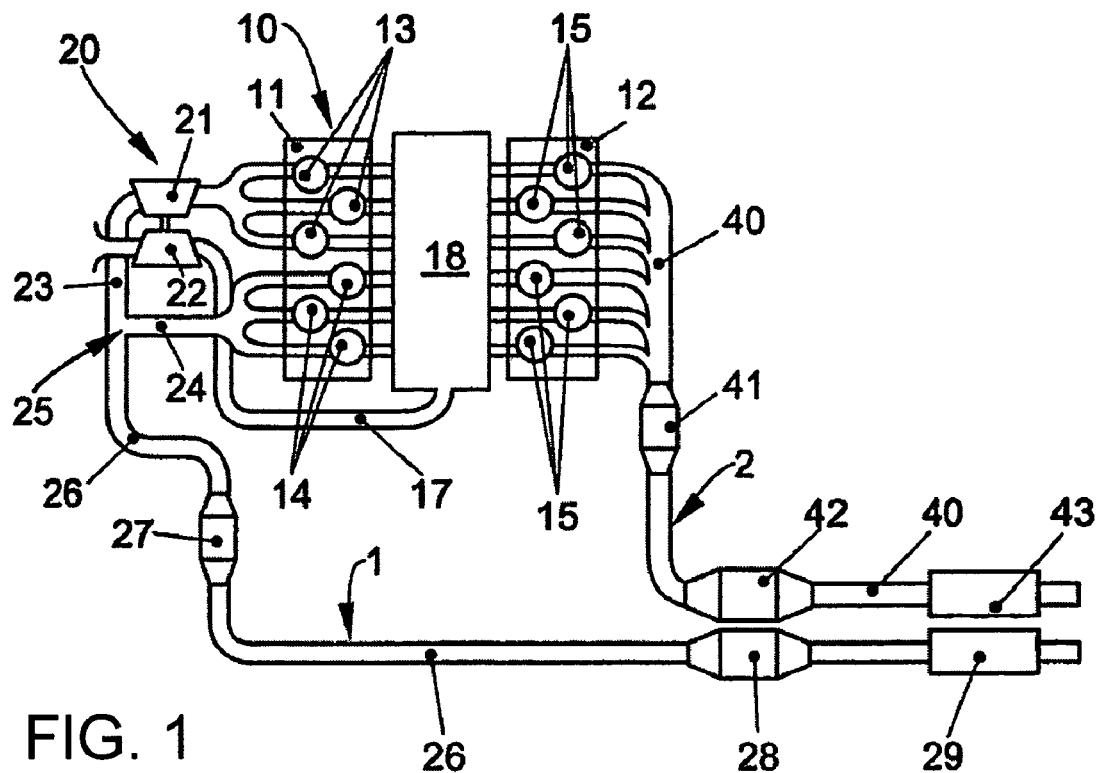
FIG. 1 is a schematic view of an engine configuration including an internal combustion engine with twelve cylinders and a turbocharger that can be supplied with exhaust gas by an exhaust gas tract in accordance with the invention.

Referring now to the figures of the drawings in detail and first, particularly, to FIG. 1 thereof, there is shown a first preferred embodiment of an engine configuration according to the invention. An internal combustion engine 10 that is embodied as a twelve-cylinder spark ignition engine has two separate cylinder banks 11 and 12 with a number of cylinders 13 and 14 and, respectively, 15. Those cylinders, which form a group with respect to their function, are respectively denoted by the same reference numeral. A first exhaust gas tract 1 and a second exhaust gas tract 2 extend separated from one another in a dual-flow configuration along their entire running length. A turbocharger 20 is provided in the first exhaust gas tract 1 and is placed, with its compressor 22, in an intake line 17. The compressor 22 supplies the air plenum 18, which is shared by both cylinder banks 11, 12, with an air-mass flow via the intake line 17.

Exhaust gas lines of the cylinders 15 of the second cylinder bank 12 lead into an exhaust gas collecting line 40 of the second exhaust gas tract 2 in which a first catalytic converter 41, in particular a precatalytic converter, and a second catalytic converter 42, in particular a main catalytic converter, and a muffler 43 are provided. The cylinders 15 are configured such that they can be deactivated, i.e. shut off, or at least their throughput be reduced.

In the first exhaust gas tract 1, a turbine 21 of the turbocharger 20 is provided in a first exhaust gas line 23 which collects exhaust gas of exhaust gas lines of the cylinders 13 and channels it into an exhaust gas collecting line 26 of the first exhaust gas tract 1. A first catalytic converter 27, in particular a precatalytic converter, and a second catalytic converter 28, in particular a main catalytic converter, and a muffler 29 are provided along the running length of the exhaust gas collecting line 26. Upstream of the first catalytic converter 27, an exhaust gas line 24 ends at a mouth 25, wherein the exhaust gas line 24 collects, via exhaust gas lines that are not specifically denoted, exhaust gas of the cylinders 14 of the first cylinder bank 11 and feeds it to the exhaust gas collecting line 26 by passing the turbocharger 20. The cylinders 14 are configured such that they can be deactivated or at least their throughput be reduced.

Figure 2:
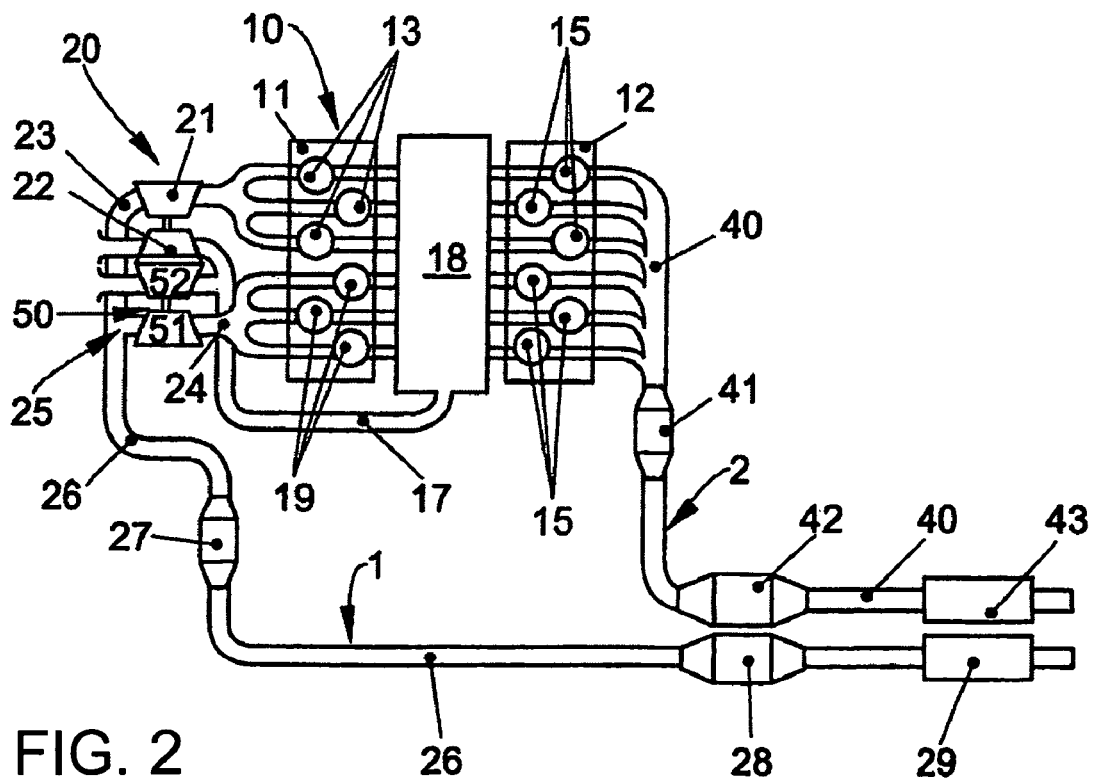
FIG. 2 is a schematic view of an engine configuration including an internal combustion engine with twelve cylinders and a respective turbocharger in each exhaust gas tract, the turbochargers being dimensioned to be equal in accordance with the invention.
Figure 3:
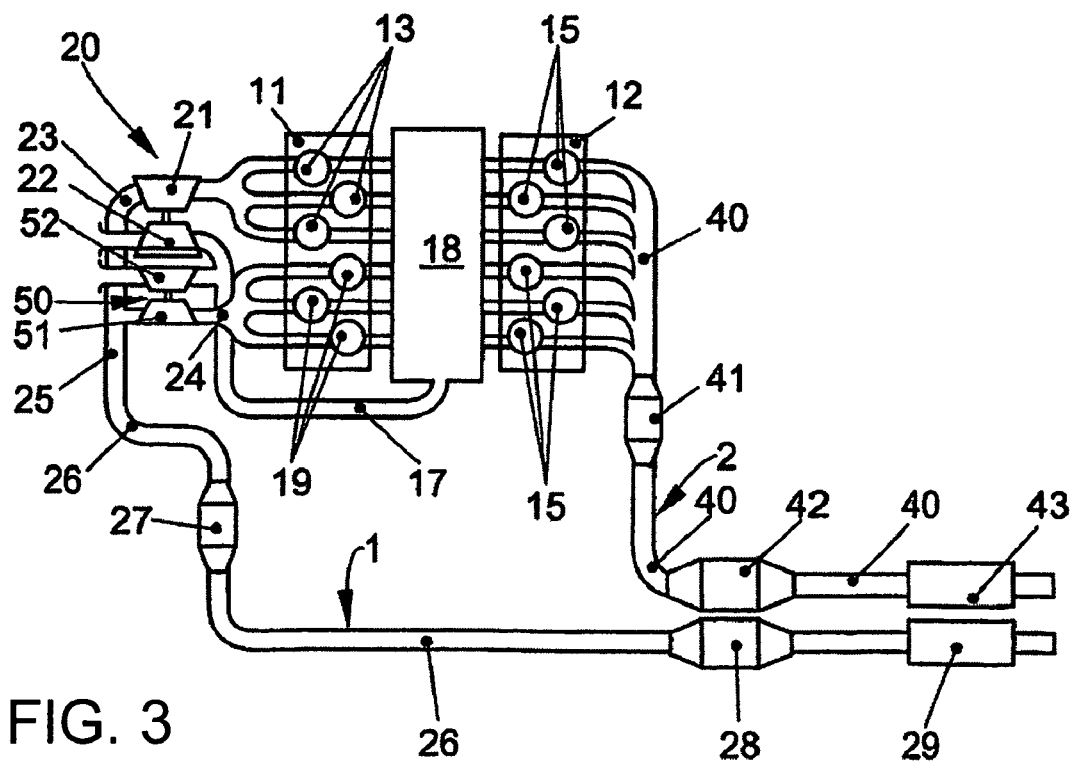
FIG. 3 is a schematic view of an engine configuration including an internal combustion engine with twelve cylinders and a respective turbocharger in each exhaust gas tract, the turbochargers being dimensioned different from one another in accordance with the invention.

FIGS. 2 and 3 illustrate an advantageous embodiment which is modified with respect to the configuration shown in FIG. 1 wherein a further turbocharger 50 is provided in the first exhaust gas tract 1. The configuration in FIGS. 2 and 3 corresponds largely to the configuration of FIG. 1 and reference is made to FIG. 1 for its explanation. Unlike in FIG. 1, a turbine 51 of the turbocharger is provided in the exhaust gas line 24 such that the turbine 51 can be supplied with exhaust gas of the cylinders 19. As can be seen in FIG. 2, the two turbochargers 20 and 50 are dimensioned to be equal whereas, in accordance with FIG. 3, the turbochargers 20 and 50 are dimensioned to be different from one another. The cylinders 19 are expediently configured such that they cannot be deactivated. The compressor 52 of the turbocharger 50 feeds compressed air into the common intake line 17 and supplies together with the compressor 22 of the turbocharger 20 the common air plenum 18. A respective part of the cylinders 13 and 19 of the first cylinder bank 11, which are assigned to the first exhaust gas tract 1, bypasses in each case one of the two turbochargers 20 and 50, to be precise their turbines 21, 51, that are assigned to the first cylinder bank 11 or the first exhaust gas tract 1. Exhaust gas of the cylinders 13 bypasses the second turbocharger 50, while exhaust gas of the cylinders 19 bypasses the first turbocharger 20.

Figure 4:
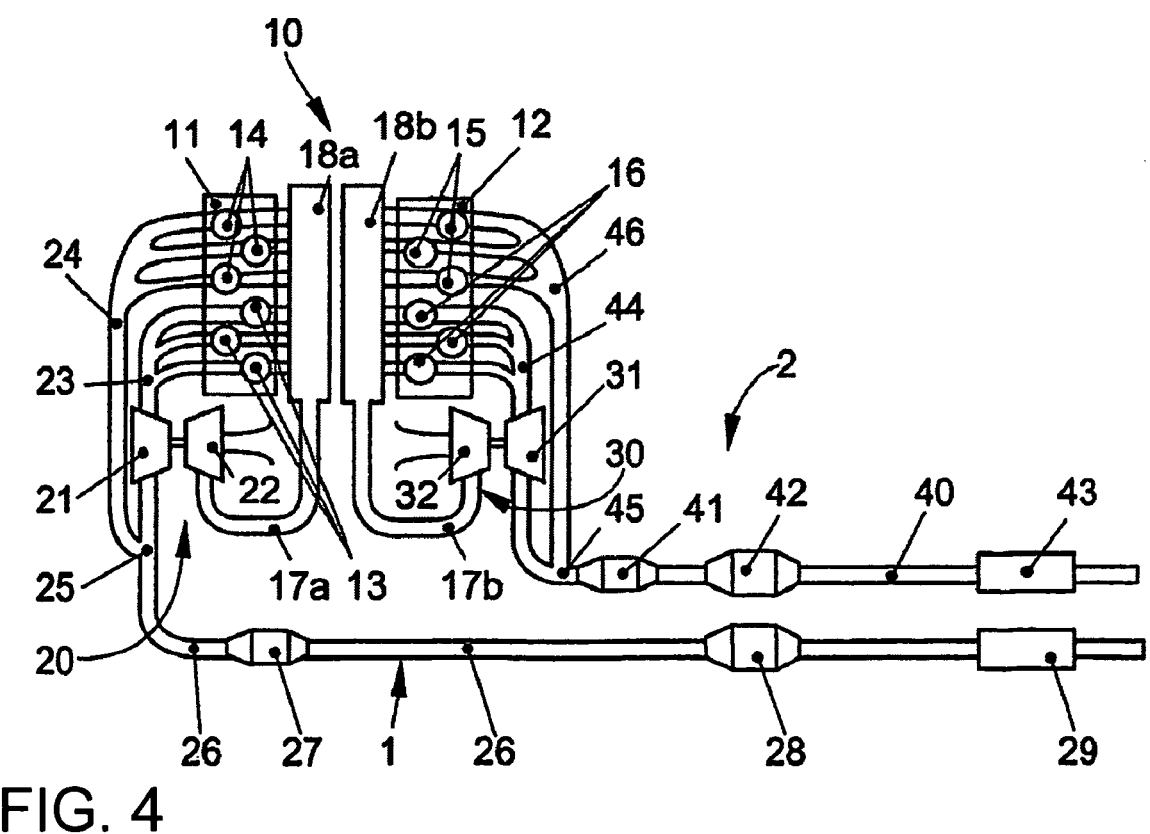
FIG. 4 is a schematic view of an engine configuration including an internal combustion engine with two turbochargers each being charged only by a part of all the cylinders in accordance with the invention.

FIG. 4 explains in a schematic representation a further preferred embodiment of the invention. An internal combustion engine 10, which is embodied as a twelve-cylinder spark ignition engine, has two separate cylinder banks 11 and 12 with a number of cylinders 13 and 14 and, respectively, 15. A first exhaust gas tract 1 and a second exhaust gas tract 2 extend separated from one another in a dual-flow configuration along their entire running length. A first turbocharger 20 is provided with its turbine 21 in the first exhaust gas tract 1 and with its compressor 22 in an intake line 17a. The compressor 22 supplies an air-mass flow to the air plenum 18a of the first cylinder bank 11. A second turbocharger 30 is provided with its turbine 31 in the second exhaust gas tract 2 and with its compressor 32 in an intake line 17b. The compressor 32 supplies an air-mass flow to the air plenum 18b of the second cylinder bank 12.

Exhaust gas lines of the cylinders 14 of the first cylinder bank 11 merge via their bypass exhaust gas line 24 into an exhaust gas collecting line 26 of the first exhaust gas tract 1 wherein a first catalytic converter 27, in particular a precatalytic converter, and a second catalytic converter 28, in particular a main catalytic converter, and a muffler 29 are provided along the running length of the exhaust gas collecting line 26. The cylinders 14 are preferably configured such that they can be deactivated, i.e. shut off. A further group of cylinders 13 feeds their exhaust gas via exhaust gas lines into an exhaust gas collecting line 23, which feeds the exhaust gas to the turbine 21 of the first turbocharger 20. The bypass exhaust gas line 24 feeds, at its mouth 25 downstream of the turbine 21, into the exhaust gas collecting line 26.

The layout at the second cylinder bank 12 is constructed in a mirror symmetry to the first cylinder bank 11. Exhaust gas lines of the cylinders 15 of the second cylinder bank 12 feed, via a bypass exhaust gas line 46, into an exhaust gas collecting line 40 of the second exhaust gas tract 2, wherein the bypass exhaust gas line 46 feeds into the exhaust gas collecting line 40 at a mouth 45. A first catalytic converter 41, in particular a precatalytic converter, and a second catalytic converter 42, in particular a main catalytic converter, and a muffler 43 are provided along the running length of the exhaust gas collecting line 40. The cylinders 15 are preferably configured such that they can be deactivated. A further group of cylinders 16 feeds their exhaust gas via exhaust gas lines into an exhaust gas collecting line 44, which feeds the exhaust gas to the turbine 31 of the second turbocharger 30. The bypass exhaust gas line 46 feeds, at its mouth 25 downstream of the turbine 31, into the exhaust gas collecting line 40.

What is claimed is:

1. An engine configuration, comprising:
   a first exhaust gas tract;
   a second exhaust gas tract;
   an internal combustion engine having a plurality of cylinders, at least some of said cylinders being assigned to said first exhaust gas tract;
   said internal combustion engine having a turbocharger with a turbine assigned to said first exhaust gas tract, at least one of said cylinders assigned to said first exhaust gas tract supplying exhaust gas to said turbine of said turbocharger;
   a bypass exhaust gas line in fluid connection with said first exhaust gas tract, said bypass exhaust gas line exhausting combustion exhaust gas, said bypass exhaust gas line starting at least one but fewer than all of said cylinders assigned to said first exhaust gas tract and bypassing said turbocharger; and
   said at least one of said cylinders, at which said bypass exhaust gas line starts, supplying no exhaust gas to said turbine of said turbocharger and said at least one of said cylinders having a throughput through said at least one of said cylinders, the throughput through said at least one of said cylinders being controlled in dependence of at least one engine characteristic selected from the group consisting of an engine load and an engine speed.

2. The engine configuration according to claim 1, including:
   a first cylinder bank and a second cylinder bank; and
   said cylinders of said internal combustion engine being disposed in a respective one of said first cylinder bank and said second cylinder bank.

3. The engine configuration according to claim 2, wherein said cylinders are assigned to a respective one of said first exhaust gas tract and said second exhaust gas tract, said cylinders assigned to said first exhaust gas tract are disposed in said first cylinder bank and said cylinders assigned to said second exhaust gas tract are disposed in said second cylinder bank.

4. The engine configuration according to claim 2, wherein:
   said internal combustion engine has a further turbocharger; and
   said turbocharger is assigned to said first cylinder bank, said further turbocharger is assigned to said second cylinder bank.

5. The engine configuration according to claim 4, including a further bypass exhaust gas line connected to said second exhaust gas tract, said further bypass exhaust gas line starting at at least one of said cylinders assigned to said second exhaust gas tract and bypassing said further turbocharger.

6. The engine configuration according to claim 4, wherein:
   said further turbocharger has a turbine; and
   given ones of said cylinders, whose exhaust gas can be fed into one of said first exhaust gas tract and said second exhaust gas tract by bypassing one of said turbine of said turbocharger and said turbine of said further turbocharger, are configured such that a throughput of said given ones of said cylinders can be one of reduced and completely deactivated.

7. The engine configuration according to claim 6, wherein said given ones of said cylinders, which are configured to be deactivatable with respect to their throughput, have a compression greater than a compression of non-deactivatable ones of said cylinders of said internal combustion engine.

8. The engine configuration according to claim 2, wherein said first cylinder bank and said second cylinder bank each have a respective separate air supply.

9. The engine configuration according to claim 2, wherein said first cylinder bank and said second cylinder bank have a common air supply.

10. The engine configuration according to claim 1, wherein said internal combustion engine has a further turbocharger, said further turbocharger is provided in said bypass exhaust gas line.

11. The engine configuration according to claim 10, wherein said further turbocharger is dimensioned to be different from said turbocharger.

12. The engine configuration according to claim 10, wherein:
said further turbocharger has a turbine; and
given ones of said cylinders, whose exhaust gas can be fed into said first exhaust gas tract by bypassing one of said turbine of said turbocharger and said turbine of said further turbocharger, are configured such that a throughput of said given ones of said cylinders can be one of reduced and completely deactivated.

13. The engine configuration according to claim 12, wherein said given ones of said cylinders, which are configured to be deactivatable with respect to their throughput, have a compression greater than a compression of non-deactivatable ones of said cylinders of said internal combustion engine.

14. The engine configuration according to claim 1, wherein said first exhaust gas tract and said second exhaust gas tract have respective running lengths and are separated from one another along said running lengths such that said first exhaust gas tract and said second exhaust gas tract form at least a dual-flow configuration along said running lengths.

15. The engine configuration according to claim 1, wherein said at least one of said cylinders, at which said bypass exhaust gas line starts and which supplies no exhaust gas to said turbine of said turbocharger has a throughput that is reduced in dependence of at least one engine characteristic selected from the group consisting of the engine load and the engine speed.

16. The engine configuration according to claim 15, wherein deactivatable ones of said given ones of said cylinders have a compression greater than a compression of non-deactivatable ones of said cylinders of said internal combustion engine.

17. The engine configuration according to claim 1, wherein said internal combustion engine is a direct-injection spark-ignition engine.

18. The engine configuration according to claim 1, wherein said at least one of said cylinders, at which said bypass exhaust gas line starts and which supplies no exhaust gas to said turbine of said turbocharger has a throughput that is completely deactivated in dependence of at least one engine characteristic selected from the group consisting of the engine load and the engine speed.

* * * * *